(12) United States Patent
Wang et al.

(10) Patent No.: US 11,639,013 B2
(45) Date of Patent: May 2, 2023

(54) MECHANICAL ARM MATERIAL DISTRIBUTION EQUIPMENT CAPABLE OF REALIZING CONSISTENCE BETWEEN A WHOLE-BODY TEXTURE AND A SURFACE DECORATION PATTERN OF CERAMIC TILE AND CONTROL METHOD FOR MECHANICAL ARM MATERIAL DISTRIBUTION AND PATTERN ADJUSTMENT

(71) Applicants: DONGGUAN CITY WONDERFUL CERAMICS INDUSTRIAL PARK CO., LTD., Guangdong (CN); JIANGXI HEMEI CERAMICS CO., LTD., Jiangxi (CN); CHONGQING WONDERFUL CERAMICS CO., LTD., Chongqing (CN)

(72) Inventors: Yongqiang Wang, Guangdong (CN); Huiyin Xiao, Guangdong (CN); Zhanwen Gu, Guangdong (CN); Weiyin Chen, Guangdong (CN); Yucheng Lin, Guangdong (CN); Ruifeng Wang, Guangdong (CN); Xuebin Liu, Guangdong (CN)

(73) Assignees: DONGGUAN CITY WONDERFUL CERAMICS INDUSTRIAL PARK CO., LTD., Dongguan (CN); JIANGXI HEMEI CERAMICS CO., LTD., Yichun (CN); CHONGQING WONDERFUL CERAMICS CO., LTD., Chongqing (CN)

( * ) Notice: Subject to any disclaimer, the term of this patent is extended or adjusted under 35 U.S.C. 154(b) by 70 days.

(21) Appl. No.: 17/099,873

(22) Filed: Nov. 17, 2020

(65) Prior Publication Data
US 2021/0069933 A1    Mar. 11, 2021

Related U.S. Application Data

(63) Continuation of application No. PCT/CN2018/109209, filed on Sep. 30, 2018.

(51) Int. Cl.
*B28B 13/02* (2006.01)
*B65G 15/00* (2006.01)
(Continued)

(52) U.S. Cl.
CPC ....... *B28B 17/0081* (2013.01); *B25J 11/0075* (2013.01); *B28B 13/027* (2013.01); *B25J 9/026* (2013.01); *B65G 15/00* (2013.01)

(58) Field of Classification Search
CPC ..... B28B 5/00; B28B 17/0081; B28B 13/027; B28B 13/022; B25J 9/026; B25J 11/0075; B65G 15/00
See application file for complete search history.

(56) References Cited

U.S. PATENT DOCUMENTS

| 3,682,230 | A | * | 8/1972 | Blower | B22C 15/24 |
| | | | | | 164/165 |
| 2005/0258149 | A1 | * | 11/2005 | Glukhoy | H05H 1/34 |
| | | | | | 219/121.48 |
| 2018/0264551 | A1 | * | 9/2018 | Ishikawa | B28B 1/001 |

FOREIGN PATENT DOCUMENTS

| CN | 102642242 A | | 8/2012 |
| CN | 102680268 A | * | 9/2012 |

(Continued)

OTHER PUBLICATIONS

International Search Report of PCT Patent Application No. PCT/CN2018/109209 dated Jun. 28, 2019.

*Primary Examiner* — Jacob T Minskey
*Assistant Examiner* — Caroline Beha

(57) ABSTRACT

The invention relates to mechanical arm material distribution equipment capable of realizing consistence between a
(Continued)

whole-body texture and surface decoration patterns of a ceramic tile and a control method thereof. The mechanical arm material distribution equipment consists of a block-shaped pattern material distribution mechanism assembly, a texture pattern material distribution mechanism assembly, and a press which are arranged in order. The control method comprises the following steps: (1) supplying power to start the mechanical arm material distribution equipment; (2) detecting whether a material level signal exists; (3) if YES, stopping operating stepless variable speed motors; (4) if NOT, operating the stepless variable speed motors; (5) detecting again whether a material level signal exists; (6) if YES, stopping operating the stepless variable speed motors; (7) if NOT, operating the stepless variable speed motors; and (8) repeating steps (2)-(7) until the equipment stops.

7 Claims, 4 Drawing Sheets

(51) Int. Cl.
    *B28B 17/00*       (2006.01)
    *B25J 11/00*       (2006.01)
    *B25J 9/02*         (2006.01)

(56) References Cited

FOREIGN PATENT DOCUMENTS

| | | | |
|---|---|---|---|
| CN | 204736309 | U | 11/2015 |
| CN | 106671263 | A | 5/2017 |
| EP | 0290953 | A1 * | 5/1988 |
| EP | 0605930 | B1 * | 12/1993 |
| EP | 0822044 | A1 * | 7/1997 |
| EP | 0922549 | A1 * | 11/1998 |
| EP | 0927687 | A2 * | 12/1998 |

\* cited by examiner

MECHANICAL ARM MATERIAL DISTRIBUTION EQUIPMENT CAPABLE OF REALIZING CONSISTENCE BETWEEN A WHOLE-BODY TEXTURE AND A SURFACE DECORATION PATTERN OF CERAMIC TILE AND CONTROL METHOD FOR MECHANICAL ARM MATERIAL DISTRIBUTION AND PATTERN ADJUSTMENT

CROSS REFERENCE TO RELATED APPLICATIONS

The present application is a Continuation Application of PCT Application No. PCT/CN2018/109209 filed on Sep. 30, 2018, the contents of which are incorporated herein by reference in their entirety.

TECHNICAL FIELD

The present invention relates to the field of mechanical arm material distribution equipment capable of realizing consistence between overall texture and surface decoration pattern of a ceramic tile and a control method for mechanical arm material distribution and pattern adjustment.

BACKGROUND

As a large category of architectural ceramics, ceramic tiles have relatively mature surface decoration technologies. Various colors of glazes and ceramic inks can be printed on surfaces of the ceramic tiles through industrial printing machines, rubber roller printing machines and inkjet printing technologies. Any texture patterns of natural stones can be imitated, however, texture patterns are mostly reflected on surfaces of the ceramic tiles. In some ceramic tiles, patterns can be formed in unfired bricks, but the patterns are disorderly or are simple linear patterns, which do not correspond to patterns of the surfaces of the ceramic tiles or correspond to simple lines of the surfaces of the ceramic tiles. Such ceramic tiles do not show consistent patterns from inside to outside after they are subjected to processing, such as slot broaching, chamfering, edge grinding, or the like.

Chinese patent application No. CN201611268007.7 discloses a forming production process for a whole-body ceramic polished tile. According to the forming production process, a conveyer belt device, a front distribution device, a powder shape correction device, a rear distribution device, a material pile slope arrangement device, a grinding device, a cutting device, a craquelure generation device, a stamping forming device and the like are reasonably controlled to operate orderly and systematically according to well-designed process steps, so that the produced tile has the characteristics of hardness, abrasion resistance and durability of common whole-body ceramic polished tiles and has rich, realistic and bright texture patterns and colors of glazed tiles. The forming production process can be used for producing the ceramic polished tile product with the texture effect of natural stone and consistent whole-body textures from inside to outside. However, this forming production process has the following disadvantages that: (1) the patterns are simply and monotonous and cannot be changed at any time, and tile products with different texture patterns are produced through different distribution systems, which results in high costs; and (2) the texture patterns cannot be formed in preset positions and are formed randomly, which cannot meet requirements of high-precision texture patterns.

SUMMARY

Technical Problems to Be Solved

An objective of the present invention is to provide mechanical arm material distribution equipment capable of realizing consistence among whole-body linear texture and colors thereof and a surface decoration pattern of a ceramic tile. Another objective of the present invention is to provide a control method for mechanical arm material distribution equipment which precisely controls material distribution positions of mechanical arms and solves the problem that only linear patterns of an unfired tile are consistent with surface decoration patterns. A further objective of the present invention is to provide a control method for pattern adjustment which can adjust the texture and patterns of an unfired tile at any time through a program without changing any components of mechanical arm material distribution equipment, thereby reducing the development difficulty.

Technical Solutions to Solve Technical Problems

A technical solution of the present invention is mechanical arm material distribution equipment capable of realizing consistence between a whole-body texture and surface decoration patterns of a ceramic tile, wherein the mechanical arm material distribution equipment consists of a block-shaped pattern material distribution mechanism assembly, a texture pattern material distribution mechanism assembly, and a press which are arranged in order; the block-shaped pattern material distribution mechanism assembly consists of a material distribution belt, a first mechanical arm arranged at a head end of the material distribution belt, and a block-shaped pattern cake material distribution device arranged at a tail end of the material distribution belt; the material distribution belt conveys a material cake with block-shaped patterns to the texture pattern material distribution mechanism assembly; the texture pattern material distribution mechanism assembly consists of a circulation conveying unit, a group of second to sixth mechanical arms arranged in order on the circulation conveying unit, a conveying unit 33 arranged at a tail end of the circulation conveying unit, and a feeding unit; and the conveying unit is used for conveying a material cake with block-shaped patterns and texture patterns to the press for molding.

In a preferred embodiment, the block-shaped pattern cake material distribution device consists of a plurality of third stepless variable speed motors, a plurality of hoppers driven by the plurality of third stepless variable speed motors, a plurality of first discharging tubes that respectively connect with the plurality of hoppers and are simultaneously suitable for dropping materials with a variety of different colors, a mixing tank connected with the plurality of first discharging tubes, a position-limiting probe provided in the mixing tank for controlling a material level, and a material distribution hopper connected with a first discharge port of the mixing tank; and operating frequencies of the plurality of third stepless variable speed motors are adjusted so that a feeding ratio can be controlled.

In a preferred embodiment, the material distribution hopper is driven by a motor to swing left and right to discharge materials, a bottom of the material distribution hopper is provided with a pneumatic gate switch, and the material distribution belt is provided below the pneumatic gate switch.

In a preferred embodiment, ends of the first discharging tubes connected with the mixing tank are each configured as a stainless steel elbow with a 90 degree bending, and the stainless steel elbows are arranged symmetrically in the mixing tank.

In a preferred embodiment, the position-limiting probe is used to control a material level in practice; when the material level in the mixing tank reaches a preset material level set by the position-limiting probe, a circuit of the position-limiting probe sends a signal to the plurality of third stepless variable speed motors so as to stop operating the plurality of third stepless variable speed motors.

In a preferred embodiment, the first mechanical arm of the block-shaped pattern material distribution mechanism assembly consists of a control rod radially arranged above a second discharge port of a storage chamber, two gears separately arranged at two ends of the control rod, two longitudinal plates which are parallel to an axis direction of the storage chamber and symmetrically arranged at two sides of the two gears, two racks which mesh with the two gears and are arranged at bottom ends of the two longitudinal plates, a swing rod which is parallel to a radial direction of the storage chamber and symmetric with respect to the storage chamber and arranged at top ends of the longitudinal plates, two longitudinal columns which are parallel to the axis direction of the storage chamber and symmetrically arranged at two ends of the swing rod, a first stepless variable speed motor which is arranged on one of the two longitudinal columns and drives the swing rod to move along the axis direction of the storage chamber, and a second stepless variable speed motor which is arranged on the swing rod and drives the two longitudinal plates to move along the radical direction of the storage chamber; and the second discharge port of the storage chamber is driven by the swing rod of the first mechanical arm to perform material distribution of block-shape patterns according to a designed pattern track; discharging of the second discharge port is controlled by pneumatic gate switch; the second discharge port is driven by the first stepless variable speed motor and the second stepless variable speed motor to respectively move according to a designed pattern track in the axis direction and the radial direction of the storage chamber; the second discharge ports with different diameters can be changed depending on sizes of the block-shaped patterns, a second discharge port with a larger diameter is used to form a larger block-shaped pattern, and a second discharge port with a smaller diameter is used to form a smaller block-shaped pattern; the first mechanical arm correspondingly completes material distribution of large block patterns, and the group of second to sixth mechanical arms cooperate to complete material distribution of linear patterns.

In a preferred embodiment, completion of the material distribution of patterns by the first mechanical arm of the block-shaped pattern material distribution mechanism assembly includes steps of extracting patterns in a CAD file; inputting tracks of the patterns into a programmable logic controller (PLC) of the mechanical arm material distribution equipment; and the first mechanical arm performing material distribution according to the tracks.

In a preferred embodiment, the conveying unit consists of a material distribution platform and a grid provided on the material distribution platform; a circulating belt connects the press and the material distribution belt; the material cake with block-shaped patterns obtained by the block-shaped material distribution mechanism assembly is conveyed to the circulating belt through the material distribution belt; after material distribution of whole-body linear patterns is performed by the group of second to sixth mechanical arms, the material cake with block-shaped patterns and whole-body linear patterns is conveyed to the feeding unit, and then to a mold frame of the press by the material distribution platform for molding; the texture pattern material distribution mechanism assembly completes material distribution of whole-body linear texture patterns; and the feeding unit consists of a transfer bin, a plurality of second discharge tubes connected to a bottom end of the transfer bin, a storage chamber to which the plurality of second discharge tubes are pooled, a second discharge port provided at a bottom of the storage chamber 323, and a gate provided at the second discharge port.

Another technical solution of the present invention is control method of mechanical arm material distribution equipment capable of realizing consistence between a whole-body texture and a surface decoration pattern of a ceramic tile, wherein the control method comprises the following steps:

(1) supplying power to start the mechanical arm material distribution equipment;
(2) detecting whether a material level signal exists;
(3) if YES, stopping operating stepless variable speed motors;
(4) if NOT, operating the stepless variable speed motors;
(5) detecting again whether a material level signal exists;
(6) if YES, stopping operating the stepless variable speed motors;
(7) if NOT, operating the stepless variable speed motors; and
(8) repeating steps (2) to (7) until the mechanical arm material distribution equipment stops.

A further technical solution of the present invention is a control method of mechanical arm material distribution equipment capable of realizing consistence between a whole-body texture and a surface decoration pattern of a ceramic tile, wherein the control method comprises the following steps:

(1) extracting patterns in a CAD file;
(2) inputting tracks of the patterns into a programmable logic controller (PLC) of the mechanical arm material distribution equipment;
(3) mechanical arms performing material distribution according the tracks;
(4) checking whether the patterns are formed at predetermined positions;
(5) if YES, returning to step (3);
(6) stopping operating stepless variable speed motors; and
(7) if NOT, returning to step (2).

Advantageous Effects (1) Material distribution with mechanical arms are used instead of positioning material distribution with templates. Two kinds of mechanical arms are designed to respectively perform material distribution of block-shaped patterns and linear patterns, and to accurately control positions of mechanical arm material distribution, which solves the problem that only linear patterns of an unfired tile can correspond to surface decoration patterns.

(2) The mechanical arm material distribution equipment do not use templates and the development and production of the templates are omitted, which can greatly shorten manufacturing cycle of a ceramic tile product. In the process of manufacturing a ceramic tile, the texture of the unfired tile can be adjusted at any time through a program, without changing any component of a feeder, thereby reducing manufacturing difficulty.

(3) The efficiency of production transfer is improved. It is not necessary to change templates in the process of distributing materials by using mechanical arms. Production transfer can be achieved by simply changing parameter settings of the mechanical arm material distribution equipment, which greatly reduces workload of production transfer and improves work efficiency.

(4) The number of layouts can be increased. New products can be increased in layouts without limitation. Compared with the design with only six layouts in previous products, inkjet design richness of products is greatly improved.

| List of Reference signs: | | | |
|---|---|---|---|
| 1 | Block-shaped pattern material distribution mechanism assembly | 11 | Material distribution belt |
| 12 | First mechanical arm | 121 | Control rod |
| 122 | Gear | 123 | Longitudinal plate |
| 124 | rack | 125 | Swing rod |
| 126 | Longitudinal column | 13 | Block-shaped pattern cake material distribution device |
| 21 | First pattern | 22 | Second pattern |
| 23 | Third pattern | 24 | Fourth pattern |
| 25 | Fifth pattern | 26 | Sixth pattern |
| 3 | Texture pattern material distribution mechanism assembly | 31 | Circulation conveying unit |
| 311 | Circulating belt | 32 | Feeding unit |
| 321 | Transfer bin | 322 | Second discharge tube |
| 323 | Storage chamber | 324 | Second discharge port |
| 325 | Gate | 33 | Conveying unit |
| 331 | Material distribution platform | 332 | Grid |
| 34 | Second mechanical arm | 35 | Third mechanical arm |
| 36 | Fourth mechanical arm | 37 | Fifth mechanical arm |
| 38 | Sixth mechanical arm | 4 | Press |
| 5 | Third stepless variable speed motor | 51 | First stepless variable speed motor |
| 52 | Second stepless variable speed motor | 6 | Hopper |
| 61 | First discharge tube | 62 | Mixing tank |
| 63 | Position-limiting probe | 64 | First discharge port |
| 65 | Material distribution hopper | 66 | Stainless steel elbow |
| 67 | Pneumatic gate switch | | |

DETAILED DESCRIPTION

Hereafter, the present invention will be described in detail with reference to accompanying drawings.

Figure 1:
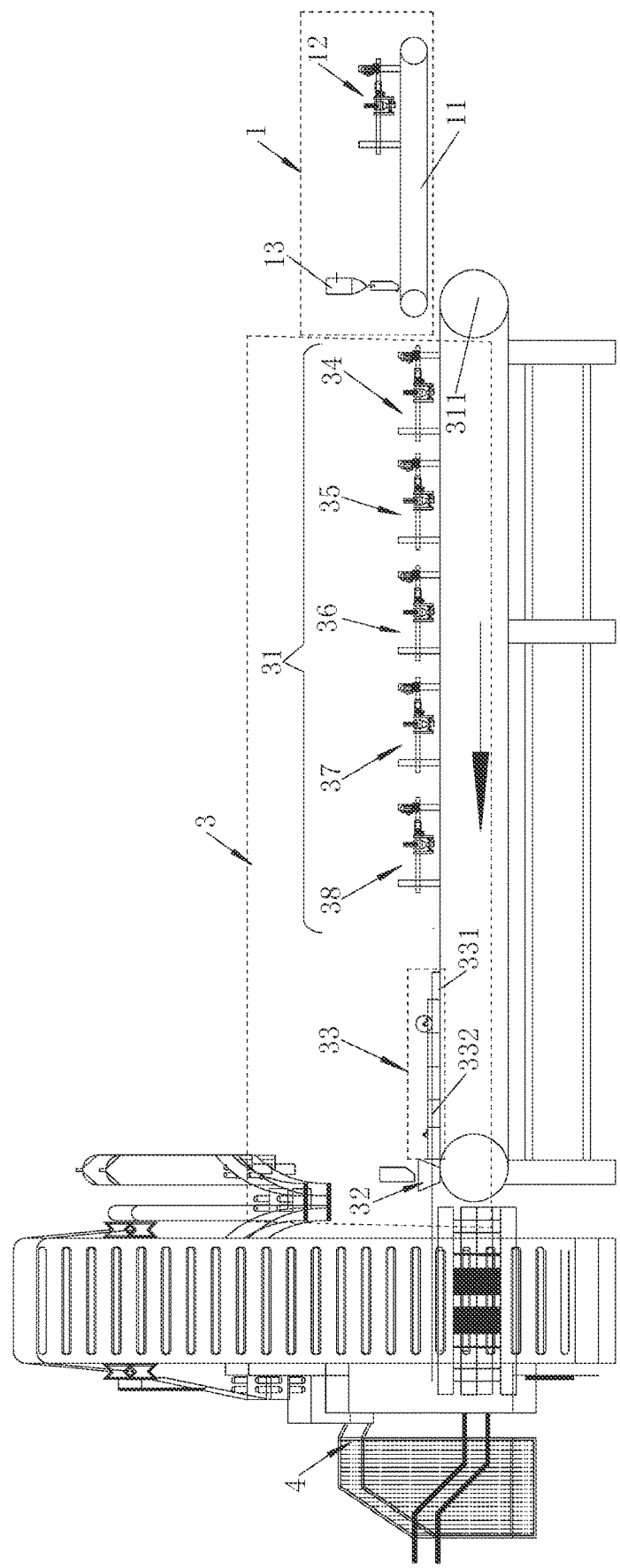
FIG. 1 is a schematic structural diagram of mechanical arm material distribution equipment according to the present invention.

As shown in FIG. 1, the mechanical arm material distribution equipment consists of a block-shaped pattern material distribution mechanism assembly 1, a texture pattern material distribution mechanism assembly 3, and a press 4 which are arranged in order. The block-shaped pattern material distribution mechanism assembly 1 consists of a material distribution belt 11, a first mechanical arm 12 arranged at a head end of the material distribution belt 11, and a block-shaped pattern cake material distribution device 13 arranged at a tail end of the material distribution belt 11. The material distribution belt 11 conveys a material cake with block-shaped patterns to the texture pattern material distribution mechanism assembly 3. The texture pattern material distribution mechanism assembly 3 consists of a circulation conveying unit 31, and a second mechanical arm 34, a third mechanical arm 35, a fourth mechanical arm 36, a fifth mechanical arm 37, and a sixth mechanical arm 38 arranged in order on the circulation conveying unit 31, as well as a conveying unit 33 arranged at a tail end of the circulation conveying unit 31, and a feeding unit 32. The conveying unit 33 is used for conveying a material cake with block-shaped patterns and texture patterns to the press 4 for molding.

Figure 4:
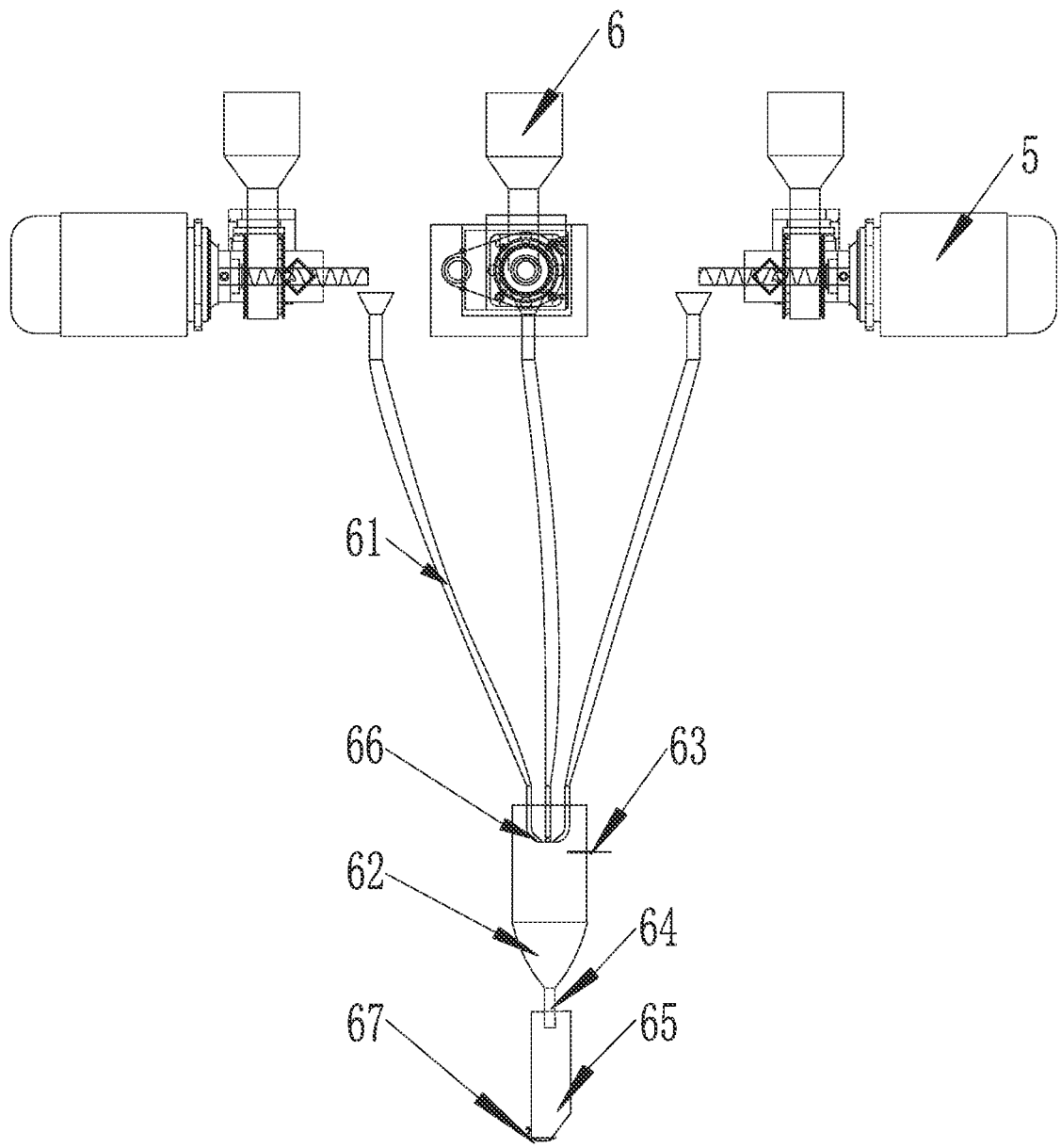
FIG. 4 is a block-shaped pattern material distribution mechanism assembly of the mechanical arm material distribution equipment according to the present invention.

Refer to FIG. 4. The block-shaped pattern cake material distribution device 13 consists of a plurality of third stepless variable speed motors 5, a plurality of hoppers 6 driven by the plurality of third stepless variable speed motors 5, a plurality of first discharging tubes 61 that respectively connect with the plurality of hoppers 6 and are simultaneously suitable for dropping materials with a variety of different colors, a mixing tank 62 connected with the plurality of first discharging tubes 61, a position-limiting probe 63 provided in the mixing tank 62 for controlling a material level, and a material distribution hopper 65 connected with a first discharge port 64 of the mixing tank 62. Operating frequencies of the plurality of third stepless variable speed motors 5 are adjusted so that a feeding ratio can be controlled. The material distribution hopper 65 is driven by a motor (not shown) to swing left and right to discharge materials. A bottom of the material distribution hopper 65 is provided with a pneumatic gate switch 67, and the material distribution belt 11 is provided below the pneumatic gate switch 67.

Refer to FIG. 4. Ends of the plurality of first discharging tubes 61 connected with the mixing tank 62 are each configured as a stainless steel elbow 66 with a 90 degree bending, and the stainless steel elbows 66 are arranged symmetrically in the mixing tank 62.

Refer to FIG. 4. The position-limiting probe 63 is used to control a material level in practice; when the material level in the mixing tank 62 reaches a preset material level set by the position-limiting probe 63, a circuit of the position-limiting probe 63 sends a signal to the plurality of third stepless variable speed motors 5 so as to stop operating the plurality of third stepless variable speed motors 5.

Figure 2:
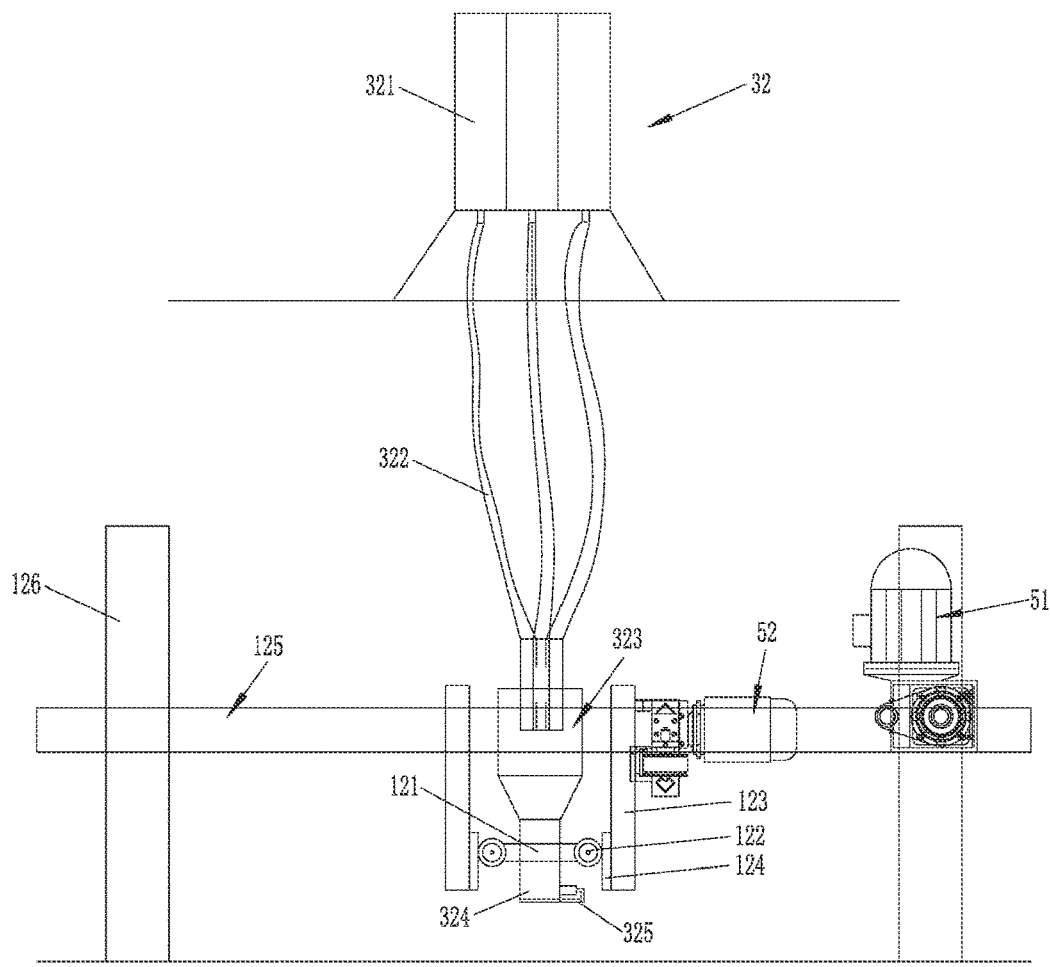
FIG. 2 is a schematic structural diagram of a feeding unit of the mechanical arm material distribution equipment according to the present invention.

Refer to FIG. 2. The first mechanical arm 12 of the block-shaped pattern material distribution mechanism assembly 1 consists of a control rod 121 radially arranged above the second discharge port 324 of the storage chamber 323, two gears 122 separately arranged at two ends of the control rod 121, two longitudinal plates 123 which are parallel to an axis direction of the storage chamber 323 and symmetrically arranged at two sides of the two gears 122, two racks 124 which mesh with the two gears 122 and are arranged at bottom ends of the two longitudinal plates 123, a swing rod 125 which is parallel to a radial direction of the storage chamber 323 and symmetric with respect to the storage chamber 323 and arranged at top ends of the longitudinal plates 123, two longitudinal columns 126 which are parallel to the axis direction of the storage chamber 323 and symmetrically arranged at two ends of the swing rod 125, a first stepless variable speed motor 51 which is arranged on one of the two longitudinal columns 126 and drives the swing rod 125 to move along the axis direction of the storage chamber 323, and a second stepless variable speed motor 52 which is arranged on the swing rod 125 and drives the two longitudinal plates 123 to move along the radical direction of the storage chamber 323. The second discharge port 324 of the storage chamber 323 is driven by the swing rod 125 of the first mechanical arm 12 to perform material distribution of block-shape patterns according to a designed pattern track. Discharging of the second discharge port 324 is controlled by a switch of a gate 325. The second discharge port 324 is driven by the first stepless variable speed motor 51 and the second stepless variable speed motor 52 to respectively move according to a designed pattern track in the axis direction and the radial direction of the storage chamber 323. The second discharge ports 324 with different diameters can be changed depending on sizes of the block-shaped patterns, a second discharge port 324 with a larger diameter is used to form a larger block-shaped pattern, and a second discharge port 324 with a smaller diameter is used to form a smaller block-shaped pattern. The first mechanical arm 12 correspondingly completes material distribution of large block patterns, and the second mechanical arm 34, the third mechanical arm 35, the fourth mechanical arm 36, the fifth mechanical arm 37, and the sixth mechanical arm 38 cooperate to complete material distribution of linear patterns. Further, the completion of the material distribution of patterns by the first mechanical arm 12 of the block-shaped pattern material distribution mechanism assembly 1 includes steps of extracting patterns in a CAD file; inputting tracks of the patterns into a programmable logic controller (PLC, not shown) of the mechanical arm material distribution equipment; and the first mechanical arm 12 performing material distribution according to the tracks.

Figure 3:
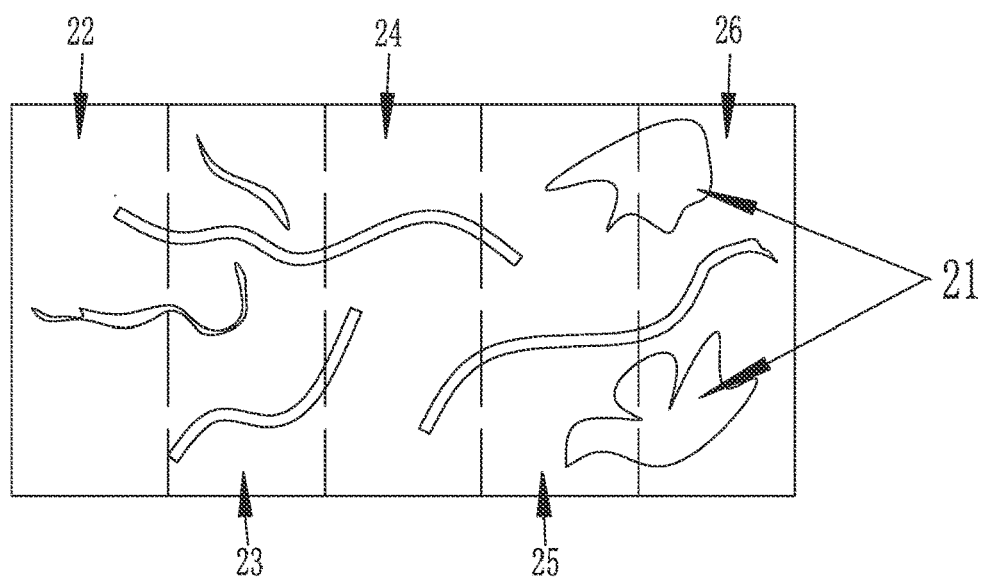
FIG. 3 shows patterns obtained by the mechanical arm material distribution equipment according to the present invention.

Refer to FIG. 3. The product pattern is divided into six parts according to texture positions, including a first pattern 21, a second pattern 22, a third pattern 23, a fourth pattern 24, a fifth pattern 25, and a sixth pattern 26, respectively. The first pattern 21 is formed by the first mechanical arm 12, and the second to sixth patterns 22 to 26 are respectively formed by the second to sixth mechanical arms 34 to 38, respectively. In other words, the large block-shaped patterns are formed by the first mechanical arm 12, and the linear patterns are formed through cooperation of the second to sixth mechanical arms 34 to 38.

Refer to FIG. 1. The conveying unit 33 consists of a material distribution platform 331 and a grid 332 provided on the material distribution platform 331. A circulating belt 311 connects the press 4 and the material distribution belt 11. The material cake with block-shaped patterns obtained by the block-shaped material distribution mechanism assembly 1 is conveyed to the circulating belt 311 through the material distribution belt 11. After material distribution of whole-body linear patterns is performed by the second to sixth mechanical arm 34 to 38, the material cake with block-shaped patterns and whole-body linear patterns is conveyed to the feeding unit 32, and then to a mold frame of the press 4 by the material distribution platform 331 for molding. The texture pattern material distribution mechanism assembly 3 completes material distribution of whole-body linear texture patterns.

Refer to FIG. 2. The feeding unit 32 consists of a transfer bin 321, a plurality of second discharge tubes 322 connected to a bottom end of the transfer bin 321, a storage chamber 323 to which the plurality of second discharge tubes 322 are pooled, a second discharge port 324 provided at a bottom of the storage chamber 323, and a gate 325 provided at the second discharge port 324.

Figure 5:
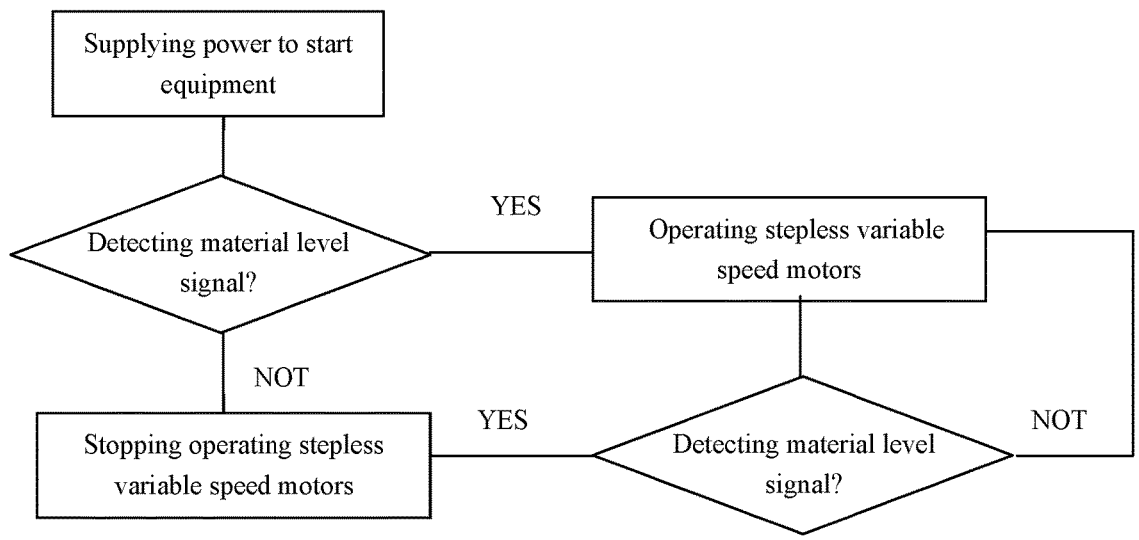
FIG. 5 shows a control method of the mechanical arm material distribution equipment according to the present invention.

Refer to FIG. 5. A control method of the mechanical arm material distribution equipment capable of realizing consistence between a whole-body texture and a surface decoration pattern of a ceramic tile comprises the following steps:
(1) supplying power to start the mechanical arm material distribution equipment;
(2) detecting whether a material level signal exists;
(3) if YES, stopping operating all stepless variable speed motors;
(4) if NOT, operating the stepless variable speed motors;
(5) detecting again whether a material level signal exists;
(6) if YES, stopping operating all the stepless variable speed motors;
(7) if NOT, operating the stepless variable speed motors; and
(8) repeating steps (2) to (7) until the mechanical arm material distribution equipment stops.

Figure 6:
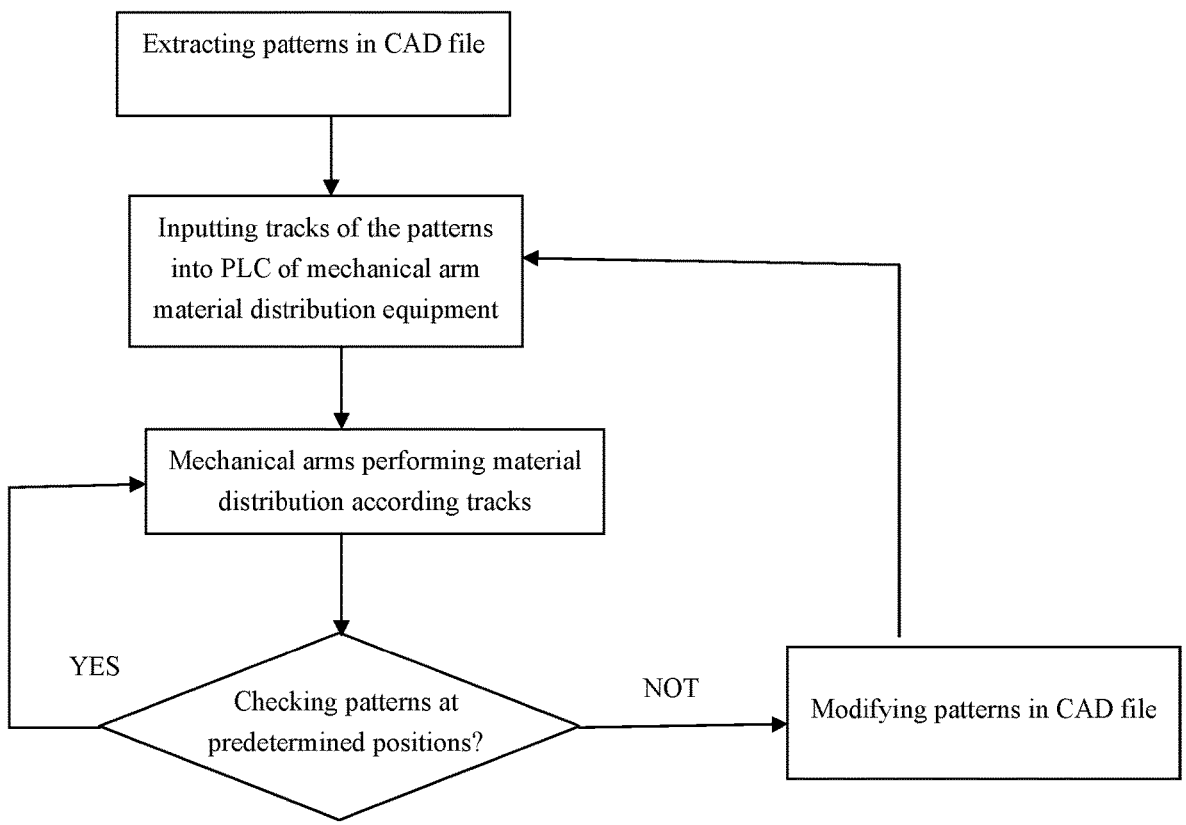
FIG. 6 show a control method for pattern adjustment of the mechanical arm material distribution equipment according to the present invention.

Refer to FIG. 6. A control method of mechanical arm material distribution equipment capable of realizing consistence between a whole-body texture and a surface decoration pattern of a ceramic tile comprises the following steps:
(1) extracting patterns in a CAD file;
(2) inputting tracks of the patterns into a programmable logic controller (PLC) of the mechanical arm material distribution equipment;
(3) all mechanical arms performing material distribution according to the tracks;
(4) checking whether the patterns are formed at predetermined positions;
(5) if YES, returning to step (3);
(6) stopping operating all stepless variable speed motors; and
(7) if NOT, returning to step (2)

INDUSTRIAL APPLICABILITY

The above-mentioned embodiments are preferred embodiments of the present invention. It is apparent that all equivalent changes and modifications made in accordance with the present invention fall within the scope of the present invention defined by the attached claims.

The invention claimed is:
1. Mechanical arm material distribution equipment capable of realizing consistence between a whole-body texture and surface decoration patterns of a ceramic tile, wherein the mechanical arm material distribution equipment consists of a block-shaped pattern material distribution mechanism assembly, a texture pattern material distribution mechanism assembly, and a press, which are arranged in order; the block-shaped pattern material distribution mechanism assembly consists of a material distribution belt, a first mechanical arm arranged at a head end of the material distribution belt, and a block-shaped pattern cake material distribution device arranged at a tail end of the material distribution belt; the material distribution belt conveys a material cake with block-shaped patterns to the texture pattern material distribution mechanism assembly; the texture pattern material distribution mechanism assembly con- sists of a circulation conveying unit, a group of second to sixth mechanical arms arranged in order on the circulation conveying unit, a conveying unit arranged at a tail end of the circulation conveying unit, and a feeding unit; and the conveying unit is used for conveying a material cake with block-shaped patterns and texture patterns to the press for molding;

the first mechanical arm of the block-shaped pattern material distribution mechanism assembly consists of a control rod radially arranged above a second discharge port of a storage chamber, two gears separately arranged at two ends of the control rod, two longitudinal plates which are parallel to an axis direction of the storage chamber and symmetrically arranged at two sides of the two gears, two racks which mesh with the two gears and are arranged at bottom ends of the two longitudinal plates, a swing rod which is parallel to a radial direction of the storage chamber and symmetric with respect to the storage chamber and arranged at top ends of the longitudinal plates, two longitudinal columns which are parallel to the axis direction of the storage chamber and symmetrically arranged at two ends of the swing rod, a first stepless variable speed motor which is arranged on one of the two longitudinal columns and drives the swing rod to move along the axis direction of the storage chamber, and a second stepless variable speed motor which is arranged on the swing rod and drives the two longitudinal plates to move along the radical direction of the storage chamber; and the second discharge port of the storage chamber is driven by the swing rod of the first mechanical arm to perform material distribution of block-shape patterns according to a designed pattern track; discharging of the second discharge port is controlled by a switch of a gate; the second discharge port is driven by the first stepless variable speed motor and the second stepless variable speed motor to respectively move according to a designed pattern track in the axis direction and the radial direction of the storage chamber; the second discharge ports with different diameters can be changed depending on sizes of the block-shaped patterns, a second discharge port with a larger diameter is used to form a larger block-shaped pattern, and a second discharge port with a smaller diameter is used to form a smaller block-shaped pattern; the first mechanical arm correspondingly completes material distribution of large block patterns, and the group of second to sixth mechanical arms cooperate to complete material distribution of linear patterns.

2. The mechanical arm material distribution equipment capable of realizing consistence between a whole-body texture and surface decoration patterns of a ceramic tile of claim 1, wherein the block-shaped pattern cake material distribution device consists of a plurality of third stepless variable speed motors, a plurality of hoppers driven by the plurality of third stepless variable speed motors, a plurality of first discharging tubes that respectively connect with the plurality of hoppers and are simultaneously suitable for dropping materials with a variety of different colors, a mixing tank connected with the plurality of first discharging tubes, a position-limiting probe provided in the mixing tank for controlling a material level, and a material distribution hopper connected with a first discharge port of the mixing tank; and operating frequencies of the plurality of third stepless variable speed motors are adjusted so that a feeding ratio can be controlled.

3. The mechanical arm material distribution equipment capable of realizing consistence between a whole-body texture and surface decoration patterns of a ceramic tile of claim 2, wherein the material distribution hopper is driven by a motor to swing left and right to discharge materials, a bottom of the material distribution hopper is provided with a pneumatic gate switch, and the material distribution belt is provided below the pneumatic gate switch.

4. The mechanical arm material distribution equipment capable of realizing consistence between a whole-body texture and surface decoration patterns of a ceramic tile of claim 2, wherein ends of the first discharging tubes connected with the mixing tank are each configured as a stainless steel elbow with a 90 degree bending, and the stainless steel elbows are arranged symmetrically in the mixing tank.

5. The mechanical arm material distribution equipment capable of realizing consistence between a whole-body texture and surface decoration patterns of a ceramic tile of claim 2, wherein the position-limiting probe is used to control a material level in practice; when the material level in the mixing tank reaches a preset material level set by the position-limiting probe, a circuit of the position-limiting probe sends a signal to the plurality of third stepless variable speed motors so as to stop operating the plurality of third stepless variable speed motors.

6. The mechanical arm material distribution equipment capable of realizing consistence between a whole-body texture and surface decoration patterns of a ceramic tile of claim 1, wherein completion of the material distribution of patterns by the first mechanical arm of the block-shaped pattern material distribution mechanism assembly includes steps of extracting patterns in a CAD file; inputting tracks of the patterns into a programmable logic controller (PLC) of the mechanical arm material distribution equipment; and the first mechanical arm performing material distribution according to the tracks.

7. The mechanical arm material distribution equipment capable of realizing consistence between a whole-body texture and surface decoration patterns of a ceramic tile of claim 1, wherein the conveying unit consists of a material distribution platform and a grid provided on the material distribution platform; a circulating belt connects the press and the material distribution belt; the material cake with block-shaped patterns obtained by the block-shaped material distribution mechanism assembly is conveyed to the circulating belt through the material distribution belt; after material distribution of whole-body linear patterns is performed by the group of second to sixth mechanical arms, the material cake with block-shaped patterns and whole-body linear patterns is conveyed to the feeding unit, and then to a mold frame of the press by the material distribution platform for molding; the texture pattern material distribution mechanism assembly completes material distribution of whole-body linear texture patterns; and the feeding unit consists of a transfer bin, a plurality of second discharge tubes connected to a bottom end of the transfer bin, a storage chamber to which the plurality of second discharge tubes are pooled, a second discharge port provided at a bottom of the storage chamber, and a gate provided at the second discharge port.

\* \* \* \* \*